United States Patent [19]

Furukawa

[11] Patent Number: 5,334,226
[45] Date of Patent: Aug. 2, 1994

[54] METHOD OF MANUFACTURING A SEALED-TYPE NICKEL-HYDROGEN CELL

[75] Inventor: Jun Furukawa, Iwaki, Japan

[73] Assignee: Furukawa Denchi Kabushiki Kaisha, Yokohama, Japan

[21] Appl. No.: 138,382

[22] Filed: Oct. 20, 1993

Related U.S. Application Data

[63] Continuation of Ser. No. 932,568, Aug. 20, 1992, abandoned.

[51] Int. Cl.[5] .......................................... H01M 10/04
[52] U.S. Cl. .................................. 29/623.2; 205/60; 320/14
[58] Field of Search ............... 429/50, 52, 101; 29/623.2; 205/60; 320/5, 14, 35

[56] References Cited

U.S. PATENT DOCUMENTS

| | | | |
|---|---|---|---|
| 4,680,241 | 7/1987 | Dyer | 320/14 X |
| 4,865,927 | 9/1989 | Laig-Horstebrock et al. | 429/50 |
| 4,926,106 | 5/1990 | Tanis | 320/35 |

OTHER PUBLICATIONS

Patent Abstracts of Japan, vol. 15, No. 86 (E-1039) Feb. 28, 1991 of JP-A-23 01 971 (Sanyo Electric Co. Ltd.) Dec. 14, 1990.

Chemical Abstracts, vol. 113: 62625t, No. 8, Aug. 20, 1990 of JP-A-1 267 966 (Matsushita Electric Industrial Co. Ltd.) Oct. 25, 1989.

Chemical Abstracts, vol. 117:93744t, No. 10, Sep. 7, 1992 of JP-A-4 065 067 (Matsushita Denki Sangyo K.K.) Mar. 2, 1992.

*Primary Examiner*—Stephen Kalafut
*Attorney, Agent, or Firm*—Armstrong, Westerman, Hattori, McLeland & Naughton

[57] ABSTRACT

A method of manufacturing a sealed-type nickel-hydrogen cell. The invention reduces the number of cycles of the charge-discharge operation required during the formation process used to manufacture a sealed-type nickel-hydrogen cell having a large high-rate discharge capacity. A sealed-type nickel-hydrogen cell is subjected to at least one cycle of a charge-discharge operation and thereafter maintained at a temperature in the range of about 30° C. to 60° C. for a predetermined length of time.

7 Claims, 1 Drawing Sheet

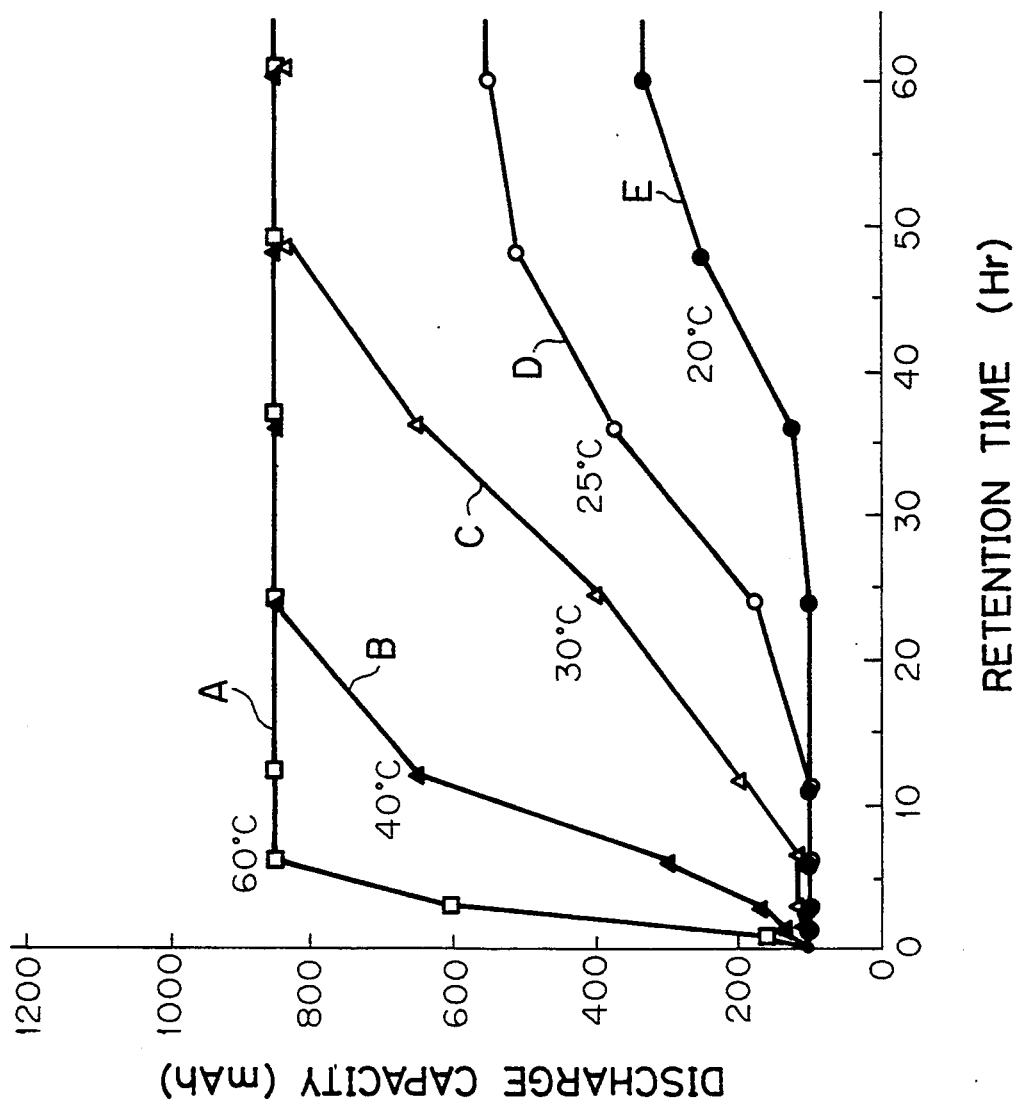

METHOD OF MANUFACTURING A SEALED-TYPE NICKEL-HYDROGEN CELL

This application is a continuation of application Ser. No. 07/932,568, filed Aug. 20, 1992, now abandoned.

BACKGROUND OF THE INVENTION

1. Field of the Invention

This invention relates to a method of manufacturing a sealed-type nickel-hydrogen cell.

2. Prior Art

It has been said heretofore that a method for manufacturing a sealed-type nickel-hydrogen cell employing a hydrogen-occlusion alloy electrode has much in common with the method used to manufacture a nickel-cadmium cell, so that it is possible to divert the existing manufacturing facilities of the latter to the manufacturing of the former. Such diversion is advantageous in terms of equipment investment.

In one example of a method for manufacturing a sealed-type nickel-hydrogen cell, a well-known paste-type nickel electrode plate and a paste-type hydrogen electrode plate are stacked in a laminated fashion with a separator placed therebetween, and rolled up together and inserted into a cylindrical can. An aqueous solution of 7N KOH, as an electrolyte, is then put into the can and a lid is then attached thereto by caulking to provide an airtight sealing of the can. This sealed-type cylindrical nickel-hydrogen cell so fabricated is subjected to a formation process in which it is charged and discharged for the formation treatment of both the nickel and the hydrogen electrode plates.

In another example of the sealed-type nickel-hydrogen cell, the paste type nickel electrode and hydrogen electrode plate are also stacked in a laminated fashion with a separator placed therebetween and are inserted flat into a square can. An aqueous solution of 7N KOH, as an electrolyte, is put into the can and a lid is then attached thereto by means of laser welding to hermetically seal the can. This square sealed-type nickel-hydrogen cell so fabricated is subjected to a formation process wherein it is charged and discharged for the formation treatment of both the nickel and the hydrogen electrode plates.

Either of the above-mentioned sealed-type nickel-hydrogen cells shows its rated capacity at a low discharge rate such as 0.2° C. when subjected to one to three cycles of the charge-discharge operation in the above-mentioned formation process. However, the discharge capacity a cell can provide at a 1C or higher discharge rate is much smaller, so that the cell has to be charged and discharged repeatedly for ten or more cycles in the formation process in order to increase the capacity. This charge-discharge operation when repeated such a large number of times makes the formation process considerably more troublesome and time-consuming and results in higher production costs and other disadvantages.

SUMMARY OF THE INVENTION

The present invention provides an improved method of manufacturing a sealed-type nickel-hydrogen cell wherein the above-noted disadvantages have been eliminated through the use of a formation process wherein the cell is kept or retained at a temperature in the range of 30° C. to 60° C. for a predetermined length of time after being subjected to at least one cycle of the charge-discharge operation.

BRIEF DESCRIPTION OF THE DRAWING

FIG. 1 is a graph showing relationships between the treatment temperatures and retention times in the formation process and the discharge capacities obtained from the respective cells.

DETAILED DESCRIPTION

The working mechanism of the method of the present invention is yet to be clarified. It may be that although a kind of pulverization occurs with one or more cycles of the charge-discharge operation applied to the cell whereby many fine cracks are formed in the hydrogen-occlusion alloy particles contained in the hydrogen-occlusion electrode which results in a remarkable increase in the surface area of the alloy particles, the electrolyte nevertheless cannot penetrate sufficiently into the alloy particles due to its comparatively high viscosity. As a result, the surface area actually contributing to the electrochemical reaction remains small. It is further assumed that when a cell after being subjected to one or more cycles of the charge-discharge operation is kept at the above-mentioned high temperature for a predetermined length of time, the viscosity of the electrolyte becomes lower and the electrolyte penetrates more thoroughly into the alloy particles and increases the effective surface area contributing to the electrochemical reaction. As a result, there is obtained a significantly increased discharge capacity at a 1C or higher rate. In this case, the greatest high-rate discharge capacity is obtained whelm the cell is kept at a temperature in the ravage of 30° C. to 60° C. for at least 6 and up to 48 hours.

EXAMPLES

In the following working examples of the present invention will be described with reference to the accompanying drawing.

Commercially available La, Ni, and Al were weighed and mixed in a predetermined composition ratio and then heat-melted by means of an arc melting method. As an example, these metals were added in proportion to produce an alloy having the composition of $LaNi_{4.5}Al_{0.5}$. This alloy was pulverized into a fine alloy powder of 250-mesh size or smaller. Added to this pulverized material were 5 wt. % of fluorocarbon resin powder and, as an electroconductive agent, 20 wt. % of carbonyl nickel powder. After mixing, an aqueous solution of a viscosity providing agent such as carboxymethyl cellulose (CMC) was added to the mixture to make a slurry. This slurry was applied to a perforated sheet and dried thereon. After that, it was pressed to a predetermined thickness and heat-treated to sinter the resisto particles, thereby manufacturing a pasted type hydrogen-occlusion electrode.

The hydrogen-occlusion electrode was used as the negative electrode and a well-known paste-type nickel electrode was used as the positive electrode. They were stacked in a laminated fashion together with a nylon separator placed therebetween, rolled up together and put into a cylindrical can. As an electrolyte, an aqueous solution of 7N KOH was put into the can and a lid was attached thereto by caulking to provide airtight sealing of the can, and to produce a cylindrical sealed-type nickel electrode-controlled 100 mAh nickel-hydrogen cell.

This sealed-type nickel-hydrogen cell fabricated in the above manner was subjected to at least one cycle of a charge-discharge operation and thereafter kept at a temperature in the range of about 30° C. to 60° C. for a desired length of time in accordance with the formation process of this invention, and finally fully charged to complete the formation thereof. As a result, it was confirmed that it is possible to obtain with one cycle of a charge-discharge operation a sealed-type nickel-hydrogen cell having a rated high discharge capacity at a 1C or higher discharge rate and capable of providing the high capacity from the initial rapid discharge while eliminating the time-consuming and troublesome repetition of the charge-discharge operation of 10 times or more as required in the conventional formation process.

In order to concretely determine the effect of the above-described treatment in the formation process according to the present invention, a plurality of the cylindrical sealed-type nickel-hydrogen cells fabricated in the above-mentioned manner were prepared for comparative testing. The cells were first subjected to one cycle of a charge-discharge operation in which they were charged with 0.1C current at 20° C. up to 150% of the rated capacity and then discharged at the same current rate to a cell voltage of 1.0 V. They were then divided into different groups, placed in a thermostatic apparatus and kept therein at different temperatures for different lengths of time, respectively. After this treatment, they were invariably charged with 0.2C current at 20° C. up to 150% of the rated capacity to complete the formation of both the nickel and the hydrogen electrodes.

The test cells subjected to the above-mentioned different formation conditions were measured for their respective discharge capacities by discharging them with 3C current at 0° C. to a cell voltage of 1.0 V. The results so obtained are as shown in FIG. 1. In the drawing, A, B, C, D and E refer to the characteristic curves for the discharge capacities of the cells obtained when the cells were maintained at 60° C., 40° C., 30° C., 25° C. and 20° C., respectively, and measured at time intervals of 10, 20, 30, 40, 50 and 60 hours while under this formation.

As is clear from the foregoing, the sealed-type hydrogen provides the largest discharge capacity when they are held at 30° C. for 48 hours, at 40° C. for 24 hours and at 60° C. for 6 hours, respectively. This largest discharge capacity corresponds to that obtained with ten or more cycles of the charge-discharge operation applied in a conventional formation process. This indicates that, according to the present invention, there can be obtained a cell or battery so formed with one cycle of a charge-discharge operation as to be capable of providing a large high-rate discharge capacity if the cell is thereafter maintained at a high temperature in the range of 30° C. to 60° C. in the formation process, the cell or battery being suited for rapid discharge use.

There have been observed some improvements in terms of the high-rate discharge capacity even when the cell was held at a lower temperature such at 20° C. or 25° C. during the formation treatment, but none was effective enough to bring about the required high discharge capacity.

When the cell was held at a temperature much higher than 60° C. during the formation process, the results were unfavorable, and included thermal deterioration of the electrode plates and the separator. On the other hand, maintaining the cell at a temperature lower than 30° C. and close to 25° C. during the formation treatment produced no effect.

The cell kept a temperature ranging from about 30° C. to 60° C. prior to initiation of the formation process produced no effect. In this case, there was even seen an adverse effect.

Although the above-described examples describe embodiments where only one cycle of the charge-discharge operation was used in the formation treatment, the charge-discharge operation can be repeated two or more times and is recommendable if it produces more cracks in the alloy particles and, consequently, more infiltration thereinto of the electrolyte. Needless to say, there is no use applying a repetitive charge-discharge operation unless it brings about a high discharge capacity greater than the largest obtainable with one cycle of said operation.

According to the present invention as described herein, a sealed-type nickel-hydrogen cell formed by a formation process wherein the cell is subjected to at least one cycle of a charge-discharge operation and thereafter kept at a temperature in the range of about 30° C. to 60° C. for a predetermined length of time, has a high discharge capacity even at a 1C or higher discharge rate, thus assuring a high discharge capacity from the initial rapid discharge operation. The invention eliminates troublesome operations and disadvantages such as the need for ten or more cycles of a continuous charge-discharge operation as required in a conventional formation process to obtain a cell or battery having a high-rate discharge capacity, and the resultant greater power consumption that increases production costs.

What is claimed is:

1. A method of manufacturing a sealed nickel-hydrogen cell, comprising:
    providing a laminate comprising a nickel electrode, a hydrogen electrode and a separator interposed between the electrodes;
    placing the laminate and an electrolyte in a container and sealing the container to form a sealed cell;
    charging and discharging the sealed cell; and
    after the step of charging and discharging the cell at least one cycle, heating the sealed cell in its discharged state to a temperature of 30°–60° C. for a time sufficient to maximize the discharge capacity of the cell.

2. The method of claim 1 wherein the heating of the sealed cell in its discharged state is at a temperature of 30° C. to 60° C. for a period of 6 to 48 hours.

3. The method of claim 2 wherein the charging and discharging of the sealed cell is for one cycle before heating in its discharged state at the temperature of 30° C. to 60° C.

4. The method of claim 2 wherein the charging and discharging of the sealed cell is for at least two cycles before heating in its discharged state at the temperature of 30° C. to 60° C.

5. The method of claim 2 wherein the heating of the sealed cell in its discharged state is at a temperature of about 30° C. for about 48 hours.

6. The method of claim 2 wherein the heating of the sealed cell in its discharged state is at a temperature of about 40° C. for about 24 hours.

7. The method of claim 2 wherein the step of heating the sealed cell in its discharged state is at a temperature of about 60° C. for about 6 hours.

* * * * *